United States Patent Office 3,713,823
Patented Jan. 30, 1973

3,713,823
PHOTOGRAPHIC CONTRAST CONTROL
Elliot Berman, Quincy, and Richard W. Philbrick, Concord, Mass., assignors to Itek Corporation, Lexington, Mass.
Filed Aug. 30, 1967, Ser. No. 664,479
Int. Cl. G03c 5/24
U.S. Cl. 96—48 HD         9 Claims

ABSTRACT OF THE DISCLOSURE

Methods of grossly or locally altering contrast in photographic images, in systems in which an image is reversibly formed prior to development, by heating the imaging medium prior to development and/or varying the period of time between image formation and development.

---

The present invention relates to methods of controlling contrast in photographic imaging systems.

The desirability of controlling image contrast in photographic imaging systems is well-recognized in the art. Setting apart those special cases in which extremely high or extremely low photographic contrast may be desirable in a photographic image for achieving special effects, in general images pleasing to the eye and maximizing the photographic information therein are obtained when contrast in the photographic images is within a certain range. The exact limits of this range are perhaps difficult to specify. However, when copying an original image having very high contrast, a copy of lower contrast is often desirable to make the contrast more acceptable. Conversely, when copying an image having very low contrast, it is usually desirable to increase contrast in the copy to bring it within the acceptable range. Since photographic contrast is often measured by the quantity gamma ($\gamma$), the desirability of images having a certain fixed range of gamma value, and the adjustment in gamma value of copies in dependence on the gamma value of the image being copied can be expressed symbolically by the equation $$\gamma_{orig} \times \gamma_{copy} = K$$

where K is a constant, and $\gamma_{orig}$ and $\gamma_{copy}$ are measures of contrast in the image being copied and in the copy, respectively.

The present invention relates to methods for controlling contrast in images produced by photographic imaging systems in which an image, usually a latent image, is reversibly formed in an imaging medium prior to development of the latent image or other fixing steps destroying the feature of reversibility. According to the present invention, it has been discovered that photographic work can be done on the imaging medium in such systems prior to, simultaneously with, or subsequent to exposure of such systems to light to form a reversible image but, in each case, prior to development of the reversible image.

Numerous systems of this type are known in the art and include, for example, electrophotography, in which a latent electrostatic image is reversibly formed in a photoconducting medium supported on an electrically conductive backing. The "reversible image" can be removed prior to development by heating or by leakage of the electrostatic image on standing. (Electrophotography is to be understood to include those processes in which the latent electrostatic image is subsequently developed on the light-sensitive imaging medium per se, as well as those processes in which the latent electrostatic image is transferred to an insulating surface prior to development.)

Numerous photographic processes employing photochromotropic materials are known in the art, for example the systems disclosed in U.S. Pat. 2,953,454 to Berman. Image formation in systems of this type, which undergo a color change on exposure to light, can be reversed by flashing with light of a different wavelength, by heating, or by prolonged standing. In photochromotropic systems, the reversible "latent" images formed are usually, but not always, visible. The step of fixing a reversible visible image in a photochromic system corresponds in the present invention with the step of developing a reversible invisible or latent image in other systems: that is reversibility is destroyed in each case.

The process of the present invention is also applicable to imaging processes like those taught in Johnson et al. patent U.S. 3,010,833, wherein photoconductive printing media having a conductive backing are exposed to light and subsequently developed by electrolyzing an electrolytic developer solution at the light-exposed and electrically conductive surface areas of the exposed medium.

The methods of the present invention are particularly useful for altering photographic images produced according to the imaging processes described in copending Berman et al. patent application Ser. No. 199,211, filed May 14, 1962, now abandoned or British counterpart, British Pat. No. 1,043,250. This application discloses photographic systems in which a latent image is reversibly produced in a semi-conductor medium on exposure to light and is subsequently developed in the absence of any externally-applied electric field. On exposure to light, the semi-conductor medium is rendered capable of causing chemical reaction at those portions of the medium which are exposed to light. The latent image so formed can be suitably developed by applying image-forming materials to the medium containing the latent image. Suitable image-forming materials include redox systems, for example systems containing reducible metal ions which are at least as easily reduced as ionic copper. The light-sensitive media useful in this process are suitably compounds formed between metal and elements of Group VI–A of the Periodic Table, e.g. oxides, sulfides, selenides, and tellurides. Preferred materials, from the point of view of color, light-sensitivity, ease of development and the like are titanium oxide and zinc oxide.

According to the present invention, image contrast in these photographic imaging systems can be altered by heating the light-sensitive medium in which a reversible image, whether "latent" (i.e. invisible) or not, is present and/or varying the period of time between formation of the reversible image in the imaging medium and development or other destruction of the reversible image therein. As will be evident further herein, the medium may be heated by numerous means, including irradiation with infrared and near infrared light.

Gross control of contrast in the image is possible by uniform heating of the imaging medium containing the reversible image and/or by delaying development of all portions of the image for the same period of time after its formation. In another embodiment of the present invention, local control of contrast is made possible by selectively heating portions of the imaging medium containing a reversible image, and/or by selectively developing portions of the image after varying periods of time measured from the time the image is formed in the imaging medium. In the case of local contrast control, it is possible to correlate the degree of contrast produced in the print image directly or inversely with the degree of contrast present in the image being copied. That is, as discussed earlier herein, it is possible to produce copy images of high contrast from original images of low contrast or vice versa.

A better understanding of the present invention and of its many advantages will be had by referring to the accompanying drawings, in which FIG. 1 is a plot of a family of curves of density vs. relative log exposure for images formed in an imaging medium comprising titanium dioxide at a number of temperatures between 75° F. and 350° F.;

Figure 1:
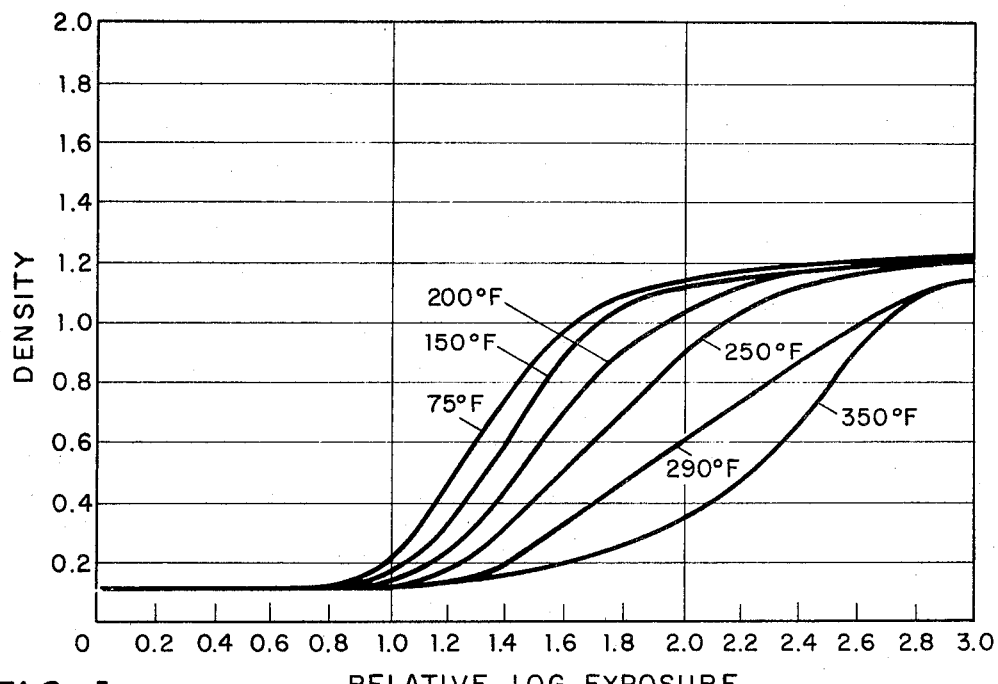

The data reported in FIG. 1 were obtained as described in following Example 1.

EXAMPLE 1

A photosensitive printing paper comprising a layer of finely-divided titanium dioxide dispersed in a polyvinyl alcohol binder and coated on a paper support sheet was placed firmly in contact with a platen equipped with a heating device. With the heating device controlled to give a platen temperature of 75° F., the paper and platen were maintained in contact for ten seconds for thermal equilibration. The paper was then exposed for one-half second in contact with a photographic step wedge while still on the heated platen. The exposed paper was then immediately developed by contact with an aqueous solution of silver nitrate which, as disclosed in copending application Ser. No. 199,211 mentioned earlier herein, causes formation of an invisible deposit of finely-divided silver in those portions of the printing medium exposed to light. The invisible, but irreversible image ("latent developed image") so formed was then made visible by contact with an aqueous solution of metol which, in the presence of silver ion still adhering to the surface of the print, caused image intensification of the invisible silver image by additional deposition of silver where silver was already present. The density of the resulting step wedge image was measured on a densitometer and the curve of FIG. 1 marked "75° F." was plotted.

A series of further exposures at 150°, 200°, 250°, 290°, and 350° F. were subsequently made under the same conditions as those reported for the exposure at 75° F., except for the difference in temperature.

It is evident from FIG. 1 that as the temperature of the imaging medium is increased, the same degree of exposure to light causes formation of a less dense image in the printing medium. The slope of each isothermal curve, which slope is a measure of gamma or photographic contrast at that temperature, decreases as temperature increases. Accordingly, it is evident from FIG. 1 that photographic images of reduced contrast can be prepared from an original of fixed contrast by heating the imaging medium to higher and higher temperatures. Surprisingly, the maximum density obtainable does not decrease significantly as temperature increases. That is, the system permits the production of good blacks and whites although, overall, contrast in the prints may be reduced.

In theory, according to the present invention a photosensitive imaging medium such as $TiO_2$ can be heated at temperatures up to its decomposition point to reduce contrast in photographic images formed therein. From a practical viewpoint, however, where a photosensitive layer is deposited on a support such as of paper, cellulose acetate, or the like, temperatures below those which would be damaginge to organic materials must be employed. Also, the effect of high temperatures on the binder used in the photosensitive layer must be considered, if such a binder is present. However, it is possible to deposit coatings of photosensitive materials such as titanium dioxide on refractory substances such as glass, metal, or ceramic, permitting the use of elevated temperatures up to the melting point of these last-mentioned materials when controlling contrast.

The photosensitive layer may be heated prior to formation of the reversible image, simultaneously with exposure, or subsequent to exposure. In all cases heating is prior to development.

Figure 2:
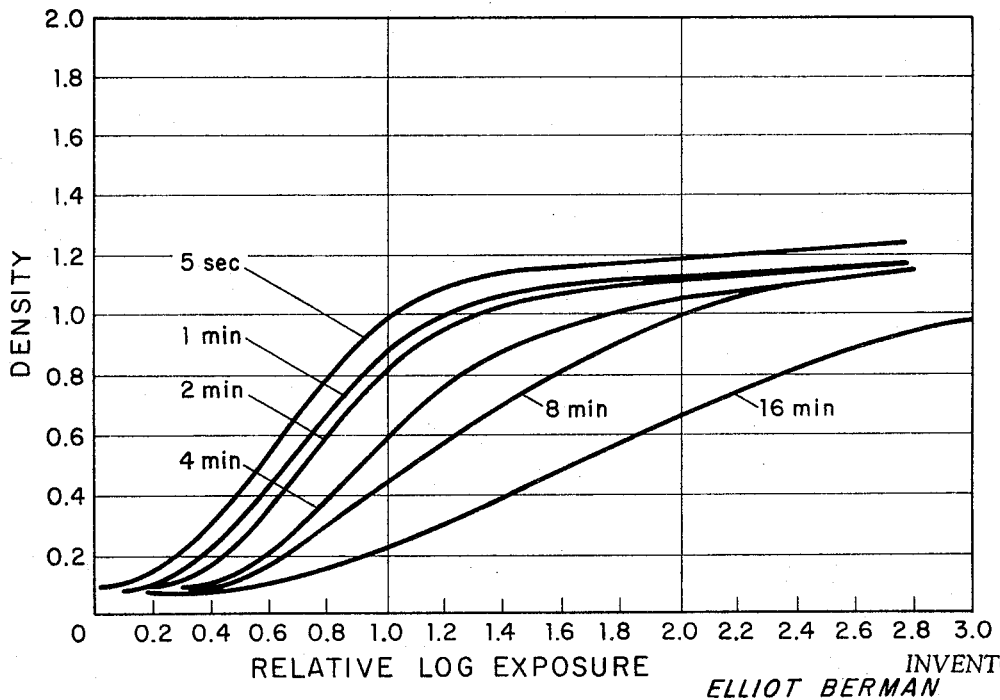
FIG. 2 is a plot of a family of curves of density vs. relative log exposure for images formed at room temperature in an imaging medium comprising titanium dioxide with different periods of time elapsing between formation of a reversible image in the imaging medium and development of the image.

FIG. 2 shows the result of delaying the development of a reversible image after its formation in a printing medium of a type used in the present invention. The data of FIG. 2 were obtained according to following Example 2.

EXAMPLE 2

A photographic printing paper like that used in Example 1 and comprising a layer of finely-divided titanium dioxide in a polyvinyl alcohol binder on a paper support was exposed for one-half second in contact with a photographic step wedge at room temperature. After five seconds, the exposed paper was contacted with an aqueous solution of silver nitrate to make the latent reversible image irreversible by formation of a latent developed image of precipitated metallic silver. The invisible silver image was subsequently made visible by contact in the print with an aqueous solution of metol, resulting in image intensification by the preferential deposition of further metallic silver at sites at which silver was already present.

Additional exposures were made, delaying development for periods of one, two, four, eight, and sixteen minutes.

The results, plotted in FIG. 2, show that by increasing the time period elapsing between formation of a reversible image and development of the image (i.e. making the image irreversible), photographic contrast is reduced. The density curves have a decreasing slope or gamma, indicating loss in photographic contrast with increased elapsed time. As was the case in FIG. 1, maximum density obtainable in the photographic system is surprisingly little affected.

Figure 3:
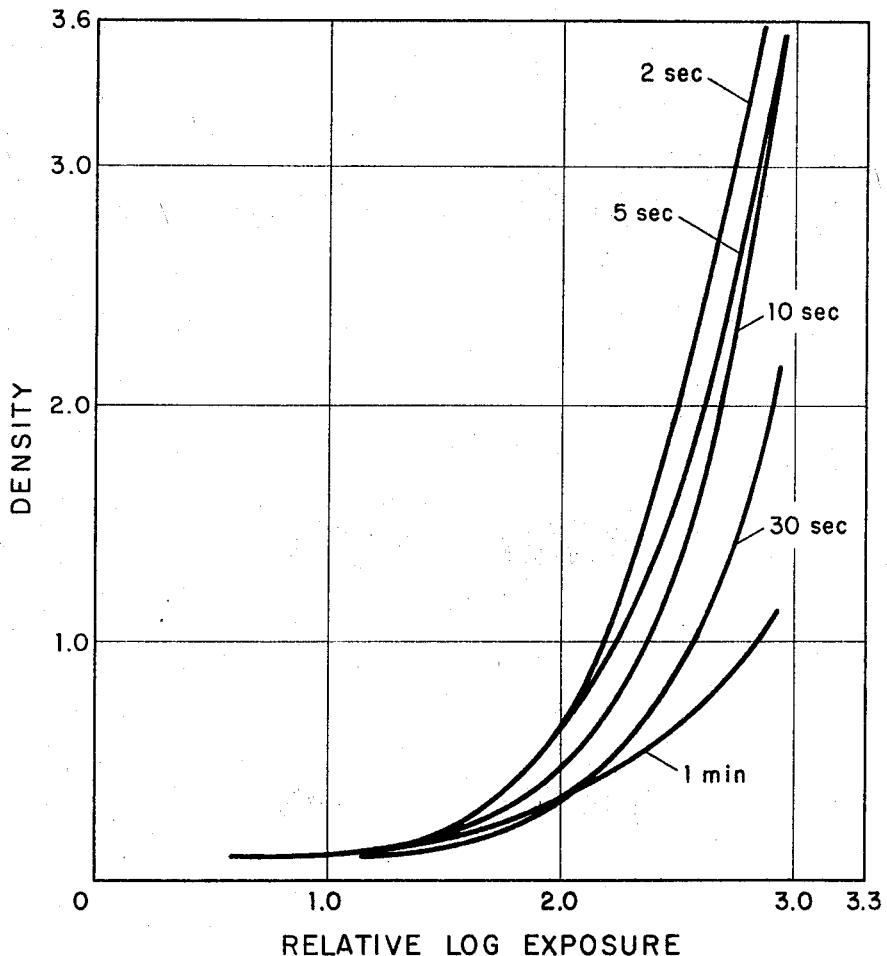
FIG. 3 is a plot of a family of curves of density vs. relative log exposure for images formed at an elevated temperture in an imaging medium comprising titanium dioxide with different periods of time elapsing between formation of a reversible image and development of the image.

FIG. 3 shows the effect of delaying development of a reversible image formed in a photographic printing medium at elevated temperature. The data in FIG. 3 were obtained according to following Example 3.

EXAMPLE 3

A photosensitive film comprising a layer of finely-divided titanium dioxide in a gelatin binder on a film base of cellulose triacetate was exposed to a step wedge for 0.001 second. During the exposure, the temperature of the film was maintained at 140° F. Two seconds after exposure at this temperature, the film was developed by contact with an aqueous solution of silver nitrate to form an invisible but irreversible (latent developed) image of metallic silver. The image was intensified to visibility by subsequent contact with an aqueous solution of metol, fixed by rinsing in an aqueous solution of thiosulfate, and washed.

The experiment was repeated with exposures at the same temperature, but with delayed times prior to development of 5, 10, 30, and 60 seconds.

The density of the resulting images was measured and plotted in FIG. 3 as a function of exposure. The figure shows that the slope of the curves (gamma) decreases as the period of time elapsing between formation of a reversible image and its development increases. Thus, as is also the case at room temperature, photographic density in images produced at elevated temperatures can be decreased by increasing the length of time elapsing between image formation and development.

Although the photographic characteristics inherent in the curves shown in FIGS. 1–3 are for specific preferred light-sensitive systems, they are typical of other systems in which a reversible image is formed prior to development or fixing. Thus, heating of an exposed electrostatic image in an electrophotographic or xerographic process, or delay in development of such an electrostatic image, results in decay of the electrostatic charge, producing reduced photographic contrast in the image to give density vs. log exposure characteristics like those shown n the figures. Similarly, in photochromic systems, such as those involving the formation of colored spiropyrans from colorless precursors by irradiation with light (cf. U.S. Pat. 2,953,454), heating of the materials or prolonged standing after exposure will cause reversion of the colored substance to the colorless form. This results in reduced contrast in prints employing the dye as an image-forming medium. In photochromic systems of this type, or in systems involving other reversible color reactions such as the conversion of colorless leuco methylene blue to its colored form, the reversiblity of the image can be destroyed (i.e. the prints can be fixed) by measures such as the evaporation of a solvent in which the materials are dispersed. The light-sensitive color reactions can proceed only with the color-forming or color substances in a dissolved state: removal of solvent from the system destroys reversibility and fixes the image.

The photographic characteristics of image-forming systems like those specifically shown in Examples 1–3 herein will vary with the nature of the imaging medium employed. For example, the ability of a material such as titanium dioxide to hold an electrostatic charge or to produce chemical reactions on irradiation, etc., is believed associated with surface phenomena involving the adsorption of oxygen at the titanium dioxide surface. Accordingly, the photographic characteristics of a given photosensitive medium containing $TiO_2$ will vary depending on the history of the titanium dioxide and on other factors such as the permeability to oxygen of any binder employed.

Since, according to the present invention, the contrast of images produced in a photographic medium can be decreased according to the techniques of gross contrast control described earlier herein, the use of an imaging medium, such as a photographic film or paper, of extremely high contrast permits the production of an entire spectrum of prints of varying photographic contrast from a single image to be copied.

The systems discussed above all involve gross control of the photographing contrast of a printing medium. However, according to the present invention, it is also possible to control contrast in a photographic image locally. According to this latter embodiment of the present invention, it is possible to increase contrast, as well as to decrease contrast in a photographic image. Further, the increase or decrease can be correlated directly or inversely with the degree of contrast present in the image being copied.

Figure 4:
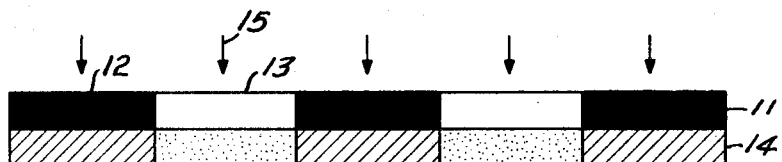
FIG. 4 is a schematic diagram showing the exposure of a photographic printing medium to heat and light while in thermal contact with the imaging medium to be copied.

FIG. 4 of the drawings shows a system by which contrast in a photographic copy can be enhanced over the contrast present in the image being copied. In FIG. 4, 11 is a photographic image transparency, such as a silver halide negative, comprising areas 12 of high density and areas 13 of low density. Printing medium 14 is in thermal contact with transparency 11. On exposure of printing medium 14 to heat and light 15 through transparency 11, e.g. from a source or sources emanating wavelengths in both the infrared and visible regions, areas 16 of the printing medium will be illuminated through areas 13 of low density in transparency 11. Maximum light absorption by portions 16 of printing medium 14 is indicated by stippling. In those portions 17 of printing medium 14 directly beneath areas 12 of high density in transparency 11, there will be little exposure to visible light. However, areas 17 will be raised in temperature by being in thermal contact with areas 12 of transparency 11. High density areas 12 of transparency 11 will evidently preferentially absorb heat and light when irradiated. Although areas 16 of medium 14 will also be heated to some extent, principally by radiation rather than by conduction of heat from transparency 11, the amount of heat absorbed in areas 16 will be small. Areas 17 of maximum heat absorption in imaging medium 14 have been indicated by cross-hatching.

Thus, those areas 16 of printing medium 14 of FIG. 4 which are most heavily exposed to light (i.e. will have the greatest photographic density on development) are also those at the lowest relative temperature, whereas those areas 17 receiving the least amount of light (having the lowest density) are at the highest temperature. Since heating of the printing medium tends to reduce density at a fixed exposure, more-exposed areas of medium 14 will tend to be denser and less-exposed areas will tend to be less dense than at uniform temperature: that is, contrast will be enhanced as compared with transparency 11.

Figure 5:
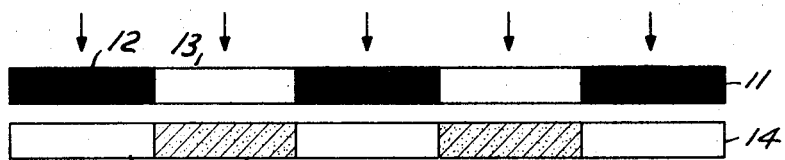
FIG. 5 is a similar schematic diagram showing the exposure of a printing medium to heat and light when not in thermal contact with the imaging medium to be copied.

As is evident from FIG. 5, if the same exposure arrangement as in FIG. 4 is employed but transparency 11 and imaging medium 14 are maintained out of thermal contact, an opposite result will be reached. In this second case, those portions 18 of imaging medium 14 under portions 13 of low density in transparency 11 will receive maximum amounts of light, as before. However, the same portions 18 will be heated preferentially as compared with portions 19 of imaging medium 14. The latter are shielded from light by dense portions 12 of transparency 11. Since heating of imaging medium 14 in this second case is substantially all by radiation with no conductive heating, light-irradiated areas 18 preferentially receive both most light and most heat.

Thus, those portions 18 of printing medium 14 which receive most light are also at elevated temperatures tending to reduce density for a given exposure time. On the other hand, those portions 19 of imaging material 14 which are at lowest temperature receive the least light but tend to increase in density. Since density differences tend to be decreased, the arrangement in FIG. 5 results in prints of lower contrast than is present in transparency 11.

Local contrast control can also be achieved according to the present invention by the time-lag method by development of selected portions of a reversible image prior to development of other portions of the image. Again, the degree of contrast in the print may be directly or inversey correlated with the contrast present in the image being copied (as in the system shown in FIGS. 4 and 5) so that the optical density in the image being copied can be used to control contrast in the print being made therefrom.

To illustrate the effect of selective time-lag development, the copying of a photographic image varying in optical density between 2 and 0.1 may be considered. Those least exposed portions of the imaging medium (corresponding with the high density areas of the image being copied) are developed after the lapsing of a relatively long time period (e.g. eight minutes) measured from the formation of a reversible image in the printing medium. Conversely, all most-exposed portions of the printing medium (corresponding with the low optical density of 0.1 in the image copied) are developed quickly (e.g. five seconds) after formation of the reversible image. Reference to FIG. 2 of the drawings will show that this system, in which there is rapid development of those portions of the image which have been most exposed to light, increases density in exposed areas. On the other hand, little-exposed areas of the printing medium have delayed development which will reduce the optical density of these areas below what would otherwise be observed with simultaneous development of all areas. As a result, contrast is enhanced since high-density areas tend to increase in density and low-density areas tend to decrease in density.

Conversely, it will be evident that delayed development of the most heavily exposed areas of a printing medium will tend to reduce the optical density of these areas, whereas the rapid development of least-exposed areas will tend to increase their optical density. In such a system, contrast in the copy is reduced as compared with the contrast present in the image being copied.

A correlation between the development time of different portions of a reversible image in a copy and the optical density of the image being copied can be effected, for example, by rapid electronic scanning of the image being copied and correlation of density measurements obtained by such scanning with selective mechanical application of developing agent in localized areas of the print being developed.

What is claimed is:

1. In photographic imaging processes in which an image is reversibly formed by exposure to a pattern of activating radiation in an imaging medium comprising a photosensitive material which is reversibly activated in exposed portions and is selected from the group consisting of a photoconductor and a phototropic material prior to development by contacting with image-forming materials capable of selectively undergoing an oxidation/reduction reaction when contacted with an exposed, activated photoconductor or fixing thereof and then developing by contacting with said image-forming materials or fixing the image of the imaging medium to a permanent image, the method of altering gamma in a visually noticeable amount in the developed or fixed image which comprises intentionally heating said imaging medium containing a reversible image to varying temperatures subsequent to said exposure to activating radiation and prior to development or fixing thereof.

2. A method as in claim 1 wherein said imaging medium is uniformly heated.

3. A method as in claim 1 wherein said imaging medium is selectively heated.

4. A method as in claim 3 wherein those portions of said imaging medium most exposed to light during formation of said reversible image are selectively least heated, whereby contrast in the developed image is enhanced.

5. A method as in claim 3 wherein those portions of said imaging medium most exposed to light during formation of said reversible image are selectively most heated, whereby contrast in the developed image is decreased.

6. A method as in claim 1 wherein said imaging medium comprises a photosensitive metallic compound of Group VI-A of the Periodic Table.

7. A method as in claim 1 wherein said imaging medium comprises photosensitive titanium dioxide or zinc oxide.

8. A method as in claim 1 wherein said varying temperatures are between about 75° F. and about 350° F.

9. A method as in claim 1 wherein said varying temperatures are a temperature of at least about 150° F.

References Cited

UNITED STATES PATENTS

| | | | |
|---|---|---|---|
| 3,031,329 | 4/1962 | Wingert | 117—36.8 |
| 3,317,321 | 5/1967 | Chopoorian | 96—88 |
| 3,380,823 | 5/1968 | Gold | 96—67 |
| 3,510,300 | 5/1970 | Fotland | 96—27 R |
| 3,414,410 | 12/1968 | Bartlett et al. | 96—27 R |
| 3,409,429 | 11/1968 | Ekman et al. | 96—88 |

FOREIGN PATENTS

| | | |
|---|---|---|
| 1,043,250 | 4/1963 | Great Britain. |

OTHER REFERENCES

Photochemistry, Calvert & Pitts, Wiley & Sons, 1966, pp. 22–23.

The Focal Encyclopedia of Photography, Focal Press, 1965, pp. 347–348.

J. TRAVIS BROWN, Primary Examiner

J. L. GOODROW, Assistant Examiner